C. H. NELSON.
MACHINE FOR TREATING OR PICKLING GRAIN.
APPLICATION FILED MAR. 23, 1916.
1,206,239.
Patented Nov. 28, 1916.
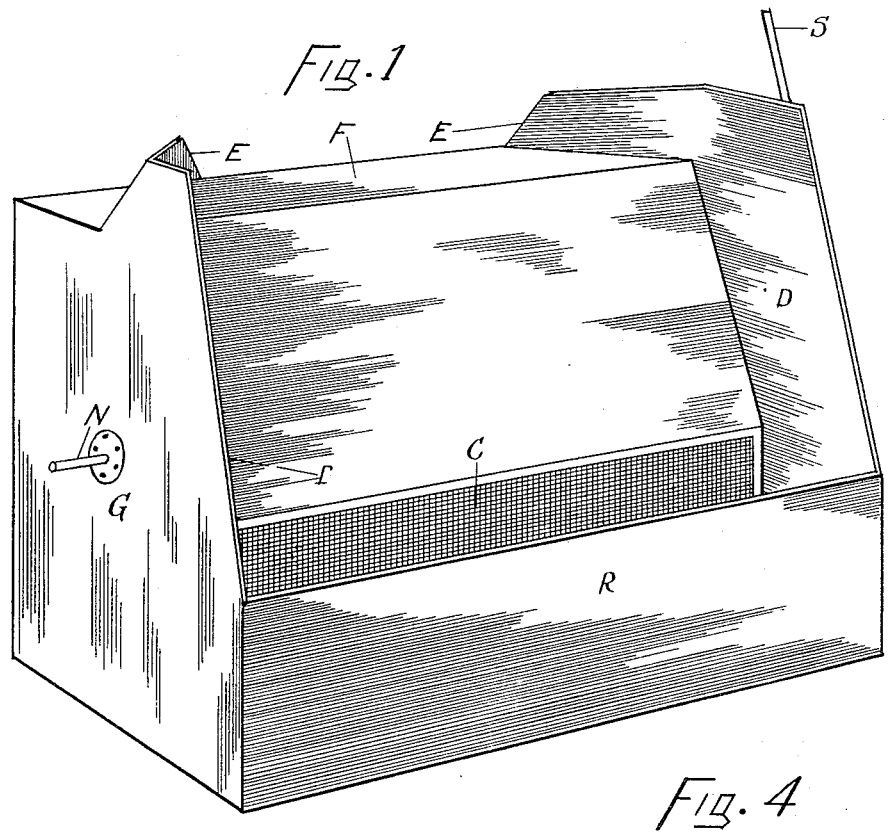
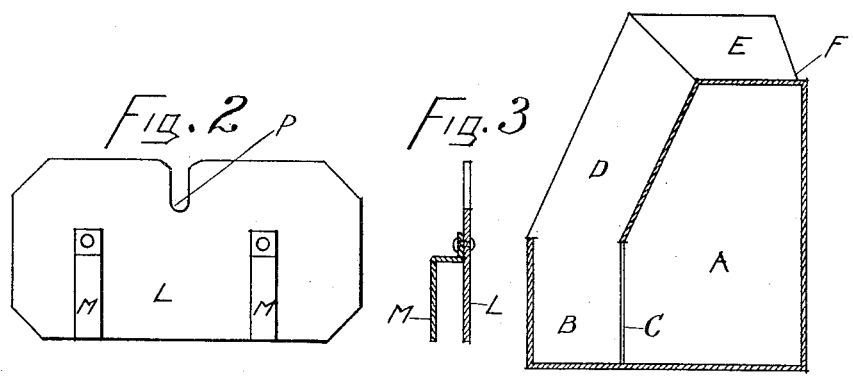
Witnesses:
Inventor.
Charles Henry Nelson

UNITED STATES PATENT OFFICE.

CHARLES HENRY NELSON, OF VULCAN, ALBERTA, CANADA.

MACHINE FOR TREATING OR PICKLING GRAIN.

1,206,239.  Specification of Letters Patent.  Patented Nov. 28, 1916.

Application filed March 23, 1916. Serial No. 86,310.

*To all whom it may concern:*

Be it known that I, CHARLES HENRY NELSON, a citizen of the Dominion of Canada, residing at the town of Vulcan, in the Province of Alberta, in the Dominion of Canada, have invented new and useful Improvements in Machines for Treating or Pickling Grain, of which the following is a specification.

This invention relates to improvements in machines for treating or pickling grain, and the primary object of this invention is to provide a convenient method for immersing grain in a solution for the purpose of killing disease germs on the grain.

This invention provides a method for treating grain for such diseases as smut and rust, which diseases render the affected grain unfit for sowing. However, if the germs of such diseases are eradicated, the grain may then be sown and no effects will be evident. It has been discovered that it is possible to kill these germs by soaking the affected grain in various solutions such as, for example, a solution of formaldehyde. This has been attempted in several ways:—in many cases by spraying the grain with the solution:—in others, by soaking the grain in a trough containing the solution. Either of these systems requires a great quantity of solution and labor, and the first method is unsatisfactory in its results. The demand is for an apparatus wherein the grain may be placed in the treating or pickling solution and treated, then taken out conveniently and quickly, leaving the balance of the solution for the treatment of more grain. Such an apparatus or machine is the one constructed in accordance with this invention.

With the foregoing and other objects in view, this invention consists in such novel features of construction, combination and arrangement of parts, as will be hereinafter more fully described, illustrated in the accompanying drawings and claimed.

In describing the invention in detail, reference will be made to the accompanying drawings, in which similar letters refer to similar parts throughout the several views, and in which;

Figure 1, is a view in perspective of a machine constructed in accordance with this invention. Fig. 2, is a side view of a bearing with mounting, one of which may be attached to each side of an ordinary wagon box, and the machine suspended thereon. Fig. 3, is a vertical cross section of the bearing shown on Fig. 5. Fig. 4, is a vertical cross section of the said machine.

Referring more particularly to the drawings, the body of the machine is shown composed of two chambers of which one is A which is completely inclosed and air tight with the exception of the side C which is a screen and which separates the chamber A from the chamber B, as shown in Fig. 4, the said screen C extending approximately the entire length of the machine from end to end. The chamber A is considerably larger than the chamber B, the outer wall R of the said chamber B extending only a little higher than the top of the screen C.

DD are extensions of the end walls GG beyond the chamber A. The extension D on each side is bent inward on the top of the machine as shown in Fig. 1, by EE.

N is a shaft running through the machine for the purpose of suspending the machine at each end of the rod N on bearings so that the machine may be tilted or rotated.

S is a handle for mechanical oscillation or tilting of the machine.

Fig. 2, is a vertical side view and Fig. 3, is a vertical cross section of a bearing and attachment for mounting on any ordinary wagon box, one on each side of the box so that the machine may be suspended on the said bearings the rod N operating on the bearings PP.

The operation of the machine is as follows:—The machine is tilted so that the solution may be poured into the chamber A through the screen C until the chamber A is practically filled with the solution. The rod N is so placed that the machine will, when released, resume an upright position as shown in Fig. 1. The grain to be treated is then placed in the chamber B, a portion of the solution having come through the screen C, the grain will be thoroughly immersed in the solution. The machine is then mechanically tilted or oscillated until the grain in B pours out between the walls DD and EE over the outside of chamber A. As the machine is tilted the solution will flow back from the chamber B into the chamber A through the screen C.

The machine has the advantage of not only saving the solution so that it can be used over and over again, but also the chamber A being large, it holds a great quantity of solution and the chamber being air tight with the exception of the screen C, it will keep the supply of solution admitted to B constant until the quantity of solution is less than sufficient to fill the chambers A and B to the height of C.

From the foregoing description taken in connection with the accompanying drawings, the advantage of construction and of the method of operating this machine will be readily apparent to those skilled in the art to which this invention appertains, and while in the foregoing description the principle of the operation of this invention has been described together with various features of construction, the combination and arrangements of parts may be altered to suit practical conditions provided such alterations are comprehended within the scope of what is claimed.

What I do claim as my invention and desire to secure by Letters Patent is:—

A grain pickling machine comprising a casing having an inclosed compartment provided with an angularly disposed front wall, a screen located at the lower end of the said wall, an open compartment adjacent to the closed compartment provided with a front wall extending above the top of the screen, the end walls of the open compartment being offset inwardly and converging toward the top end and a frame operatively supporting the said casing.

Calgary, March 14th, 1916.

CHARLES HENRY NELSON.

Signed in the presence of—
EDITH MARY CLARK,
MILLARD H. KAHLER.

Copies of this patent may be obtained for five cents each, by addressing the "Commissioner of Patents, Washington, D. C."